United States Patent
Noguchi et al.

(10) Patent No.: US 7,423,085 B2
(45) Date of Patent: Sep. 9, 2008

(54) CARBON BLACK COMPOSITE MATERIAL AND METHOD OF PRODUCING THE SAME, AND COMPOSITE ELASTOMER

(75) Inventors: Toru Noguchi, Ueda (JP); Akira Magario, Chusagotu-gun (JP)

(73) Assignee: Nissan Kogyo Co., Ltd., Nagano (JP)

( * ) Notice: Subject to any disclaimer, the term of this patent is extended or adjusted under 35 U.S.C. 154(b) by 642 days.

(21) Appl. No.: 11/046,249

(22) Filed: Jan. 31, 2005

(65) Prior Publication Data

US 2005/0192396 A1 Sep. 1, 2005

(30) Foreign Application Priority Data

Feb. 6, 2004 (JP) ............................. 2004-030355
Sep. 10, 2004 (JP) ............................. 2004-263980

(51) Int. Cl.
*C08K 3/04* (2006.01)

(52) U.S. Cl. ..................... 524/495; 524/496; 524/441; 524/494

(58) Field of Classification Search ................ 524/495, 524/496, 441, 494
See application file for complete search history.

(56) References Cited

U.S. PATENT DOCUMENTS

| | | | | |
|---|---|---|---|---|
| 3,297,571 A | * | 1/1967 | Bonis | ............... 75/230 |
| 3,389,001 A | | 6/1968 | Blackburn et al. | |
| 4,069,181 A | * | 1/1978 | Healy et al. | ............... 524/70 |
| 4,438,004 A | * | 3/1984 | Myers | ............... 428/550 |
| 2004/0241440 A1 | | 12/2004 | Noguchi et al. | |

FOREIGN PATENT DOCUMENTS

| | | |
|---|---|---|
| JP | A 2000-007423 | 1/2000 |
| WO | WO 90/10296 A1 | 9/1990 |
| WO | WO 00/48279 | 8/2000 |
| WO | WO 02/076888 A1 | 10/2002 |
| WO | WO 03/060002 A1 | 7/2003 |

OTHER PUBLICATIONS

U.S. Appl. No. 11/041,258, filed Jan. 25, 2005, Noguchi et al.
U.S. Appl. No. 10/895,351, filed Jul. 21, 2004, Noguchi et al.

* cited by examiner

*Primary Examiner*—Ling-Siu Choi
(74) *Attorney, Agent, or Firm*—Oliff & Berridge, PLC

(57) ABSTRACT

A method of producing a carbon black composite material includes: a step (a) of mixing an elastomer and carbon black to obtain a composite elastomer; and a step (b) of mixing the composite elastomer and a matrix material to obtain a carbon black composite material in which the carbon black is uniformly dispersed in the matrix material.

17 Claims, 7 Drawing Sheets

PARTIALLY ENLARGED VIEW

CARBON BLACK COMPOSITE MATERIAL AND METHOD OF PRODUCING THE SAME, AND COMPOSITE ELASTOMER

Japanese Patent Application No. 2004-30355, filed on Feb. 6, 2004, and Japanese Patent Application No. 2004-263980, filed on Sep. 10, 2004, are hereby incorporated by reference in their entirety.

BACKGROUND OF THE INVENTION

The present invention relates to a carbon black composite material and a method of producing the same, and a composite elastomer.

It is known that carbon black is used as reinforcing fillers for an elastomer such as rubber. A ceramic matrix composite material using carbon black has been proposed (see Japanese Patent Application Laid-open No. 2000-7423, for example).

However, a composite material in which carbon black is uniformly dispersed in a matrix material other than an elastomer, such as a metal, has not been proposed. It is known that the compositing performance of the composite material is affected by wettability between the matrix material and the reinforcing material and dispersibility of the reinforcing material in the matrix material.

BRIEF SUMMARY OF THE INVENTION

A first aspect of the present invention relates to a method of producing a carbon black composite material, the method including:

a step (a) of mixing an elastomer and carbon black to obtain a composite elastomer; and a step (b) of mixing the composite elastomer and a matrix material to obtain a carbon black composite material in which the carbon black is uniformly dispersed in the matrix material.

A second aspect of the present invention relates to a carbon black composite material obtained by the above method.

DETAILED DESCRIPTION OF THE EMBODIMENT

Figure 1:
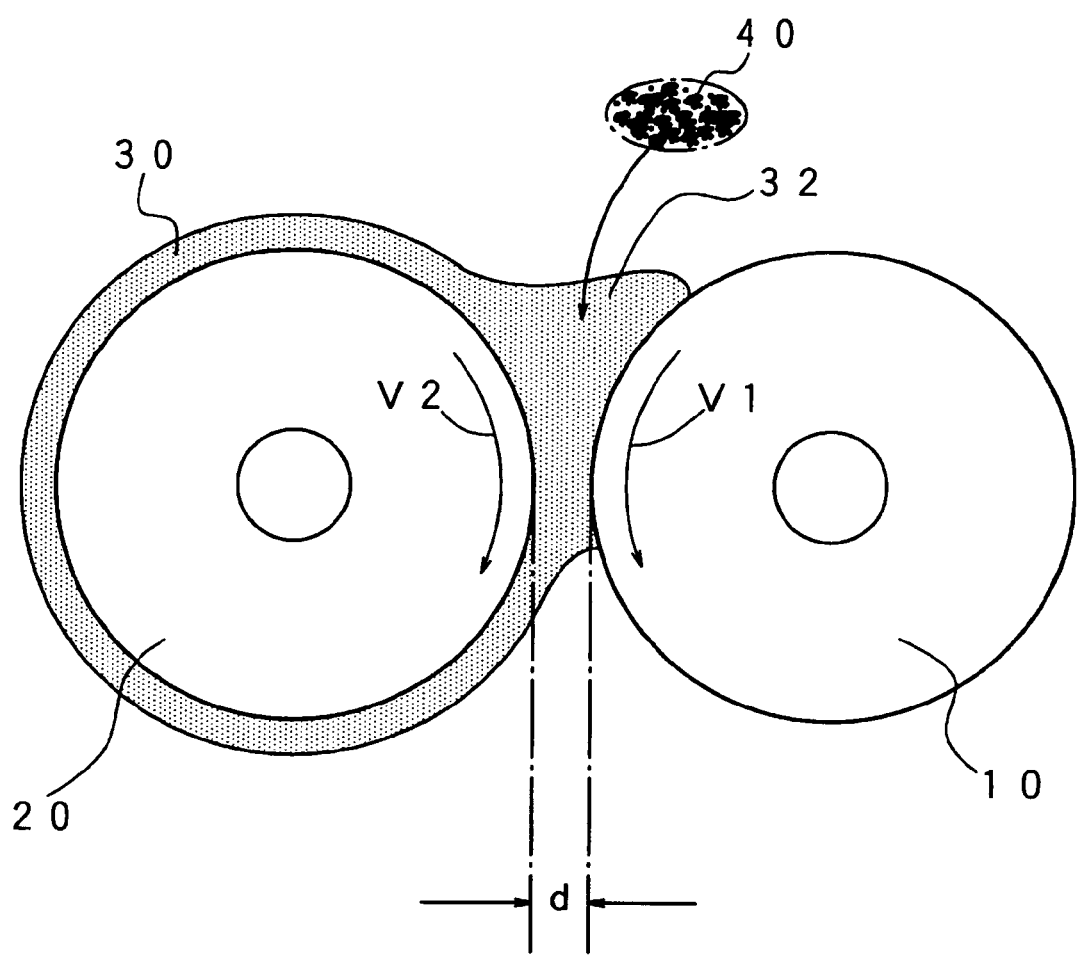
FIG. 1 schematically shows a kneading method for an elastomer and carbon black using an open-roll method according to one embodiment of the present invention.

The present invention may provide a carbon black composite material in which dispersibility of carbon black in a matrix material is improved, a method of producing the same, and a composite elastomer.

One embodiment of the present invention provides a method of producing a carbon black composite material, the method including:

a step (a) of mixing an elastomer and carbon black to obtain a composite elastomer; and a step (b) of mixing the composite elastomer and a matrix material to obtain a carbon black composite material in which the carbon black is uniformly dispersed in the matrix material.

According to the production method of this embodiment, a composite elastomer in which carbon black is uniformly dispersed in an elastomer can be obtained by mixing the elastomer and the carbon black, and a carbon black composite material in which carbon black is uniformly dispersed in a matrix material can be obtained by using the composite elastomer. A comparatively grown carbon black aggregate or fine particle carbon black, which is advantageous as the reinforcing material, is dispersed to only a small extent. However, such carbon black can be dispersed by the production method in this embodiment. The carbon black composite material in this embodiment thus obtained is an excellent material in which dispersibility of the carbon black is improved and which has a uniform compositing performance such as improved strength and improved abrasion resistance.

With this method of producing a carbon black composite material, the step (b) may include decomposing and removing the elastomer in the composite elastomer when mixing the composite elastomer and the matrix material.

This enables the elastomer unnecessary for the composition of the carbon black composite material to be decomposed and removed.

With this method of producing a carbon black composite material, the step (a) may include mixing and dispersing the carbon black in the elastomer by a shear force.

The carbon black can be comparatively easily dispersed in the elastomer by performing the step (a) in this manner. The step (a) of obtaining the composite elastomer may be performed by using (a-1) an open roll method with a roll interval of 0.5 mm or less, (a-2) a closed kneading method with a rotor gap of 1 mm or less, (a-3) a multi-screw extruding kneading method with a screw gap of 0.3 mm or less, or the like.

The carbon black is present in a state of either constituent particles or an aggregate in which the constituent particles are fused and connected. The carbon black used in this embodiment may have an average constituent particle diameter of 100 nm or less. The reinforcing effect can be increased as the constituent particle of the carbon black is smaller. However, it becomes difficult to disperse the carbon black due to aggregating properties. However, according to the production method in this embodiment, even such small carbon black can be dispersed.

The reinforcing effect of the carbon black is affected by the degree of the structure of the aggregate. The degree of the structure may be indicated by DBP absorption ($cm^3/100$ g) according to JIS K 6217-4 (2001) "Carbon black for rubber industry—Fundamental characteristics—Part 4: Determination of DBP absorption". The carbon black used in this embodiment may have a DBP absorption of 50 $cm^3/100$ g or more. Although the reinforcing effect can be increased as the carbon black structure is higher, it becomes difficult to disperse the carbon black due to aggregating properties. However, according to the production method of this embodiment, carbon black having such a high structure can be dispersed.

The matrix material used in this embodiment may be a metal. The metal may be aluminum or an aluminum alloy.

According to this embodiment, carbon black having an aggregating tendency can be dispersed in a metal. In particular, since the carbon black can withstand a high-temperature heat treatment, the carbon black can be used for various types of metal forming. The weight of the carbon black composite material can be reduced by using aluminum or an aluminum alloy as the matrix.

When using a metal as the matrix material in the method of producing a carbon black composite material according to this embodiment, the step (b) may include:

(b-1) powder-forming the composite elastomer;

(b-2) mixing the composite elastomer and the metal in a fluid state, and causing the mixture to solidify; and (b-3) causing the metal that has been melted to permeate the composite elastomer to replace the elastomer with the melted metal.

The matrix material used in this embodiment may be glass.

The carbon black can also be dispersed in the composite material using glass as the matrix. The glass reinforcing effect or heat radiation effect can be obtained by the carbon black.

When using glass as the matrix material in the method of producing a carbon black composite material according to this embodiment, the step (b) may include:

(b-4) powder-forming the composite elastomer;

(b-5) mixing the composite elastomer and the glass in a fluid state, and then causing a mixture of the composite elastomer and the glass to solidify; and (b-6) causing the glass that has been melted to permeate the composite elastomer to replace the elastomer with the melted glass.

The embodiments of the present invention are described below in detail with reference to the drawings.

The carbon black composite material according to the present invention includes the carbon black uniformly dispersed in the metal material or glass.

A method of producing a carbon black composite material according to this embodiment comprises: a step (a) of mixing an elastomer and carbon black to obtain a composite elastomer; and a step (b) of mixing the composite elastomer and a matrix material to obtain a carbon black composite material in which the carbon black is uniformly dispersed in the matrix material.

In the method of producing a carbon black composite material according to the present invention, the step (b) may include decomposing and removing the elastomer in the composite elastomer when mixing the composite elastomer and the matrix material.

In the method of producing a carbon black composite material according to the present invention, the step (a) may include mixing and dispersing the carbon black in the elastomer by a shear force.

(I) Carbon Black

As the carbon black in the present invention, carbon black of various grades using various raw materials may be used. The carbon black may be in a state of either constituent particles (primary particles) or an aggregate in which the constituent particles are fused and connected (agglomerate). Carbon black having a comparatively high structure in which the aggregate is grown is preferable as reinforcing fillers.

The carbon black used in the present invention has an average constituent particle diameter of preferably 100 nm or less, and still more preferably 50 nm or less. The volume effect and the reinforcing effect are increased as the diameter of the carbon black particle is smaller. The average particle diameter is preferably 10 to 30 nm in practical application.

The diameter of the carbon black particle is also indicated by the nitrogen adsorption specific surface area. In this case, the nitrogen adsorption specific surface area is 10 $m^2/g$ or more, and preferably 40 $m^2/g$ or more when measured as the nitrogen adsorption specific surface area ($m^2/g$) according to JIS K 6217-2 (2001) "Carbon black for rubber industry—Fundamental characteristics—Part 2: Determination of specific surface area—Nitrogen adsorption methods—Single-point procedures".

The reinforcing effect of the carbon black used in the present invention is affected by the degree of the structure of the aggregate in which the constituent particles are fused. The reinforcing effect is increased if the DBP absorption is 50 $cm^3/100$ g or more, and preferably 100 $cm^3/100$ g or more. This is because the aggregate forms a higher structure as the DBP absorption is greater.

As the carbon black used in the present invention, grades such as SAF-HS (N134, N121), SAF (N110, N115), ISAF-HS (N234), ISAF (N220, N220M), ISAF-LS (N219, N231), ISAF-HS (N285, N229), HAF-HS (N339, N347), HAF (N330), HAF-LS (N326), T-HS (N351, N299), T-NS (N330T), MAF (N550M), FEF (N550), GPF (N660, N630, N650, N683), SRF-HS-HM (N762, N774), SRF-LM (N760M, N754, N772, N762), FT, HCC, HCF, MCC, MCF, LEF, MFF, RCF, and RCC, and conductive carbon black such as Tokablack, HS-500, acetylene black, and Ketjenblack may be used.

The carbon black in this embodiment is used as a raw material when producing a composite elastomer by mixing the carbon black with an elastomer, and producing a carbon black composite material using the composite elastomer.

The carbon black may be provided with improved adhesion and wettability with an elastomer by subjecting the carbon black to a surface treatment such as an ion-injection treatment, sputter-etching treatment, or plasma treatment before kneading the carbon black and an elastomer or a metal material/glass.

(II) Elastomer Used in Step (a)

The carbon black is easily aggregated and is dispersed in the matrix material to only a small extent. Therefore, the carbon black is mixed with an elastomer to obtain a composite elastomer in which the carbon black is dispersed in the elastomer. As the elastomer, an elastomer having a molecular weight of preferably 5,000 to 5,000,000, and still more preferably 20,000 to 3,000,000 is used. If the molecular weight of the elastomer is within this range, since the elastomer molecules are entangled and linked, the elastomer easily enters the space in the carbon black aggregate. Therefore, the effect of separating the carbon black particles is increased. If the molecular weight of the elastomer is less than 5,000, since the elastomer molecules cannot be sufficiently entangled, the effect of dispersing the carbon black particles is reduced even if a shear force is applied in the subsequent step. If the molecular weight of the elastomer is greater than 5,000,000, the elastomer becomes too hard, whereby processing becomes difficult.

The network component of the elastomer in a non-crosslinked form has a spin-spin relaxation time ($T2n/30°$ C.) measured at 30° C. by a Hahn-echo method using a pulsed nuclear magnetic resonance (NMR) technique of preferably 100 to 3,000 μsec, and still more preferably 200 to 1,000 μsec. If the elastomer has the spin-spin relaxation time ($T2n/30°$ C.)

within the above range, the elastomer is flexible and has sufficiently high molecular mobility. Therefore, when the elastomer and the carbon black are mixed, the elastomer can easily enter the space between the carbon black particles due to high molecular mobility. If the spin-spin relaxation time (T2$n$/30° C.) is shorter than 100 μsec, the elastomer cannot have sufficient molecular mobility. If the spin-spin relaxation time (T2$n$/30° C.) is longer than 3,000 μsec, the elastomer tends to flow as a liquid, whereby it becomes difficult to disperse the carbon black.

The network component of the elastomer in a crosslinked form preferably has a spin-spin relaxation time (T2$n$) measured at 30° C. by the Hahn-echo method using the pulsed NMR technique of 100 to 2,000 μsec. The reasons therefor are the same as those described for the noncrosslinked form. Specifically, when a noncrosslinked form which satisfies the above conditions is crosslinked according to the method of the present invention, the spin-spin relaxation time (T2$n$) of the resulting crosslinked form almost falls within the above range.

The spin-spin relaxation time obtained by the Hahn-echo method using the pulsed NMR technique is a measure which represents molecular mobility of a substance. In more detail, when the spin-spin relaxation time of the elastomer is measured by the Hahn-echo method using the pulsed NMR technique, a first component having a first shorter spin-spin relaxation time (T2$n$) and a second component having a second longer spin-spin relaxation time (T2$nn$) are detected. The first component corresponds to the network component (backbone molecule) of the polymer, and the second component corresponds to the non-network component (branched component such as a terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method in the pulsed NMR technique, a solid-echo method, a Carr-Purcell-Meiboom-Gill (CPMG) method, or a 90° pulse method may be applied in addition to the Hahn-echo method. However, since the elastomer according to one embodiment of the present invention has a medium spin-spin relaxation time (T2), the Hahn-echo method is most suitable. Generally, the solid-echo method and the 90° pulse method are suitable for the measurement of a short spin-spin relaxation time (T2), the Hahn-echo method is suitable for the measurement of a medium spin-spin relaxation time (T2), and the CPMG method is suitable for the measurement of a long spin-spin relaxation time (T2).

At least one of the main chain, the side chain, and the terminal chain of the elastomer may include at least one of a double bond, a triple bond, α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group as an unsaturated bond or a group.

As the elastomer, elastomers such as natural rubber (NR), epoxidized natural rubber (ENR), styrene butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), and polysulfide rubber (T); thermoplastic elastomers such as olefin-based elastomers (TPO), poly(vinyl chloride)-based elastomers (TPVC), polyester-based elastomers (TPEE), polyurethane-based elastomers (TPU), polyamide-based elastomers (TPEA), polystyrene-based elastomers (SBS); and mixtures of these elastomers may be used.

The carbon black is generally easily aggregated and is dispersed in a medium to only a small extent in the case of nano-sized ultrafine particles. However, if the composite elastomer in this embodiment is used as a raw material for a metal composite elastomer, since the carbon black is present in the elastomer in a dispersed state, the carbon black can be easily dispersed in a medium by mixing the raw material and the medium such as a metal.

(III) Step (a) of Obtaining Composite Elastomer by Mixing Carbon Black and Elastomer In the step (a) of obtaining the composite elastomer, the following methods may be used while using the above-described carbon black and elastomer, for example.

For example, (a-1) an open roll method with a roll interval of 0.5 mm or less, (a-2) a closed kneading method with a rotor gap of 1 mm or less, and (a-3) a multi-screw extruding kneading method with a screw gap of 0.3 mm or less can be given.

In this embodiment, an example of using SAF-HS (N134) carbon black as the carbon black and using the open roll method (a-1) with a roll interval of 0.5 mm or less is described below as the step (a) of obtaining the composite elastomer.

Since the SAF-HS (N134) carbon black is ultrafine particles with an average particle diameter of 18 nm and has a high structure with a DBP absorption of 130 cm$^3$/100 g, it is difficult to disperse the SAF-HS (N134) carbon black. Therefore, it is preferable that the elastomer have the features described in (II), for example.

FIG. 1 is a view schematically showing an open-roll method using two rolls. In FIG. 1, a reference numeral 10 indicates a first roll, and a reference numeral 20 indicates a second roll. The first roll 10 and the second roll 20 are disposed at a predetermined distance d of preferably 1.0 mm or less, and still more preferably 0.1 to 0.5 mm. The first and second rolls are rotated either normally or reversely. In the example shown in FIG. 1, the first roll 10 and the second roll 20 are rotated in the directions indicated by the arrows. When the surface velocity of the first roll 10 is indicated by V1 and the surface velocity of the second roll 20 is indicated by V2, the surface velocity ratio (V1/V2) of the first roll 10 to the second roll 20 is preferably 1.05 to 3.00. A desired shear force can be obtained by using such a surface velocity ratio. When an elastomer 30 is wound around the second roll 20 in a state in which the first and second rolls are rotated, a bank 32 in which the elastomer is deposited between the rolls 10 and 20 is formed.

Carbon black 40 is added to the bank 32 in which the elastomer 30 has accumulated, and the first and second rolls 10 and 20 are rotated. The distance between the first and second rolls 10 and 20 is reduced to the distance d, and the first and second rolls 10 and 20 are rotated at the above-mentioned predetermined surface velocity ratio. This causes a high shear force to be applied to the elastomer 30, and the aggregated carbon black is separated by the shear force so that the carbon black is pulled out one particle at a time, and dispersed in the elastomer 30.

In the step (a) of obtaining the composite elastomer, it is preferable that the carbon black and the elastomer be kneaded at a shear force as high as possible. In this step, the elastomer and the carbon black are mixed at a comparatively low temperature of preferably 0 to 50° C., and still more preferably 5 to 30° C. in order to obtain a shear force as high as possible. In the case of using the open-roll method, it is preferable to set the roll temperature at the above temperature.

In this embodiment, the elastomer having an appropriately long molecular length and high molecular mobility enters the space between the carbon black particles. When a high shear force is applied to the mixture of the elastomer and the carbon black, the carbon black moves accompanying the movement of the elastomer, whereby the aggregated carbon black is separated and dispersed in the elastomer. As a result, the carbon black in the composite material can have excellent dispersion stability.

The step (a) of obtaining the composite elastomer may be performed by using the above-mentioned closed kneading method (a-2) or multi-screw extrusion kneading method (a-3) in addition to the open roll method (a-1). In other words, it suffices that this step apply a shear force to the elastomer sufficient to separate the aggregated carbon black particles.

In the step (a), metal particles or nonmetal particles sufficiently larger than the carbon black may be mixed into the elastomer at the same time with or before the carbon black. The metal particles or nonmetal particles are mixed and dispersed in the elastomer in advance, and allow the carbon black to be further uniformly dispersed when mixing the carbon black. As the metal particles, particles of aluminum and an aluminum alloy, magnesium and a magnesium alloy, iron and an iron alloy, and the like may be used either individually or in combination of two or more. In particular, a metal the same as the metal which becomes the matrix in the step (b) or its alloy may be used. As the nonmetal particles, silicic acid particles, mineral particles, and the like may be used either individually or in combination of two or more. When the matrix material is glass, glass particles or oxides mixed into glass may be used as the nonmetal particles. The metal particles and nonmetal particles preferably have an average particle diameter greater than the average particle diameter of the carbon black to be used. The average particle diameter of the metal particles or nonmetal particles is 500 μm or less, and preferably 1 to 300 μm. When using a pressureless permeation method in the metal mixing step (b), the amount of metal particles and nonmetal particles is 10 to 3,000 parts by weight, and preferably 100 to 1,000 parts by weight for 100 parts by weight of the elastomer. If the amount of metal particles and nonmetal particles is less than 10 parts by weight, the permeation rate of a melted metal is decreased due to a small degree of capillary phenomenon, thereby giving rise to problems from the viewpoint of productivity and cost. If the amount of metal particles and nonmetal particles exceeds 3,000 parts by weight, impregnation with the elastomer becomes difficult when producing the composite elastomer. The shape of the metal particles and nonmetal particles is not limited to spherical. The metal particles and nonmetal particles may be in the shape of a sheet or a scale insofar as turbulent flows occur around the metal particles and nonmetal particles during mixing.

A composite elastomer obtained by the step of mixing and dispersing the carbon black in the elastomer (mixing and dispersing step) may be crosslinked using a crosslinking agent and formed into a desired shape, or may be formed without crosslinking the composite elastomer. The composite elastomer thus obtained may produce a carbon black composite material by the step (b).

In the mixing and dispersing step of the elastomer and the carbon black or in the subsequent step, additives usually used for processing elastomers such as rubber may be added. As the additives, conventional additives may be used. Examples of additives include a crosslinking agent, a vulcanizing agent, a vulcanization accelerator, a vulcanization retarder, a softener, a plasticizer, a curing agent, a reinforcing agent, a filler, an aging preventive, a colorant, and the like.

(IV) Step (b) of Obtaining Carbon Black Composite Material

In the step (b) of obtaining the carbon black composite material, various forming methods as described below may be used while using the composite elastomer obtained in the step (a), for example.

For example, (b-1) a method of powder-forming the composite elastomer, (b-2) a method of mixing the composite elastomer with the metal in a fluid state and causing the mixture to solidify, (b-3) a method of causing melted metal to permeate the composite elastomer to replace the elastomer with the melted metal, (b-4) a method of powder-forming the composite elastomer, (b-5) a method of mixing the composite elastomer with the glass in a fluid state and causing the mixture to solidify, (b-6) a method of causing melted glass to permeate the composite elastomer to replace the elastomer with the melted glass, and the like can be given.

The methods (b-1) to (b-3) are production methods when using a metal material as the matrix material, and the methods (b-4) to (b-6) are production methods when using a glass material as the matrix material.

As the method (b-1), a carbon black composite material may be obtained by compressing the composite elastomer including the metal particles obtained in the step (a) or frozen and ground particles of the composite elastomer in a die, and sintering the compressed product at a metal sintering temperature (550° C. in the case of aluminum, for example). Therefore, the powder-forming in this embodiment includes powder metallurgy. The powder-forming in this embodiment includes not only the case of using a powdered raw material, but also the case of using a raw material formed in the shape of a block by compression preforming the composite elastomer.

For example, the frozen and ground particles of the composite elastomer obtained in the step (a) and particles of another metal which becomes the matrix of the composite material may be mixed (dry-blended or wet-blended, for example) and sintered using the sintering method to obtain a carbon black composite material.

The frozen and ground particles of the composite elastomer and particles of another metal may be mixed (dry-blended, for example), compression-formed in a die, and sintered to obtain a carbon black composite material. As the sintering method, a generally-used sintering method, a spark plasma sintering method (SPS) using a plasma sintering device, or the like may be employed.

Particles of another metal and the particles of the composite elastomer may be mixed (dry-blended, for example), and a carbon black composite material may be obtained by using a powder forging method or a powder injection method. The carbon black composite material produced by such powder-forming allows the carbon black to be dispersed in the metal material. It is preferable that the particles of another metal used in this step be the same material as the particles of the metal used to obtain the carbon black composite material. The diameter of the particles may be arbitrarily selected depending on the application of the composite material obtained by powder-forming or the like.

As the step (b-2), the composite elastomer obtained in the step (a) and a metal in a fluid state (melted metal) are mixed and caused to solidify to obtain a composite material, for example. In such a casting step, the composite elastomer and a melted metal are mixed first. Specifically, a metal such as aluminum is dissolved (650 to 800° C.) in a crucible, and the composite elastomer is placed in the crucible while stirring the dissolved aluminum to mix the aluminum and the composite elastomer. The stirring may be caused by rotation in one direction. However, the mixing effect is increased by stirring the mixture in three directions (three dimensions). The melted aluminum metal mixed in an air atmosphere or an inert atmosphere may be cast using a metal mold casting method, a diecasting method, or a low-pressure diecasting method, in which the melted metal is poured into a die made of steel, for example. A method classified as a special casting method, such as a high-pressure casting method (squeeze casting) in which a melted metal is caused to solidify at a high pressure, a thixocasting method in which a melted metal is stirred, or a centrifugal casting method in which a melted metal is cast in a die by utilizing a centrifugal force may also be employed. In the above casting method, the melted metal is caused to solidify in a die in a state in which the composite elastomer is mixed into the melted metal to form a carbon black composite metal material having a desired shape.

In thixocasting, it is preferable that aluminum be dissolved at 700 to 800° C., the temperature be lowered while stirring the dissolved aluminum to obtain a thixotropic state at 400 to 600° C., and the composite elastomer be mixed in this state. Since the viscosity is increased in the thixotropic state, uniform dispersion can be achieved. It is preferable to perform the casting step in an inert atmosphere, such as a nitrogen atmosphere, a weak reducing atmosphere in which a small amount of hydrogen gas is added to nitrogen, or under vacuum, since the melted metal (melted aluminum metal, for example) is prevented from being oxidized to exhibit higher wettability with the carbon black. In this casting step, the elastomer in the composite elastomer is decomposed and removed by the heat of the melted metal.

The carbon black composite material obtained by the above production method may be used as an ingot and formed into a desired form by using a casting method, a powder forging method, a powder extrusion forming method, or a powder injection forming method, for example.

The carbon black composite material produced by such powder-forming and casting step allows the carbon black to be dispersed in the metal material.

In this embodiment, the casting step (b-3) using a pressureless permeation method in which the melted metal is caused to permeate the composite elastomer obtained in the step (a) is described below in detail with reference to FIGS. 2 and 3.

Figure 2:
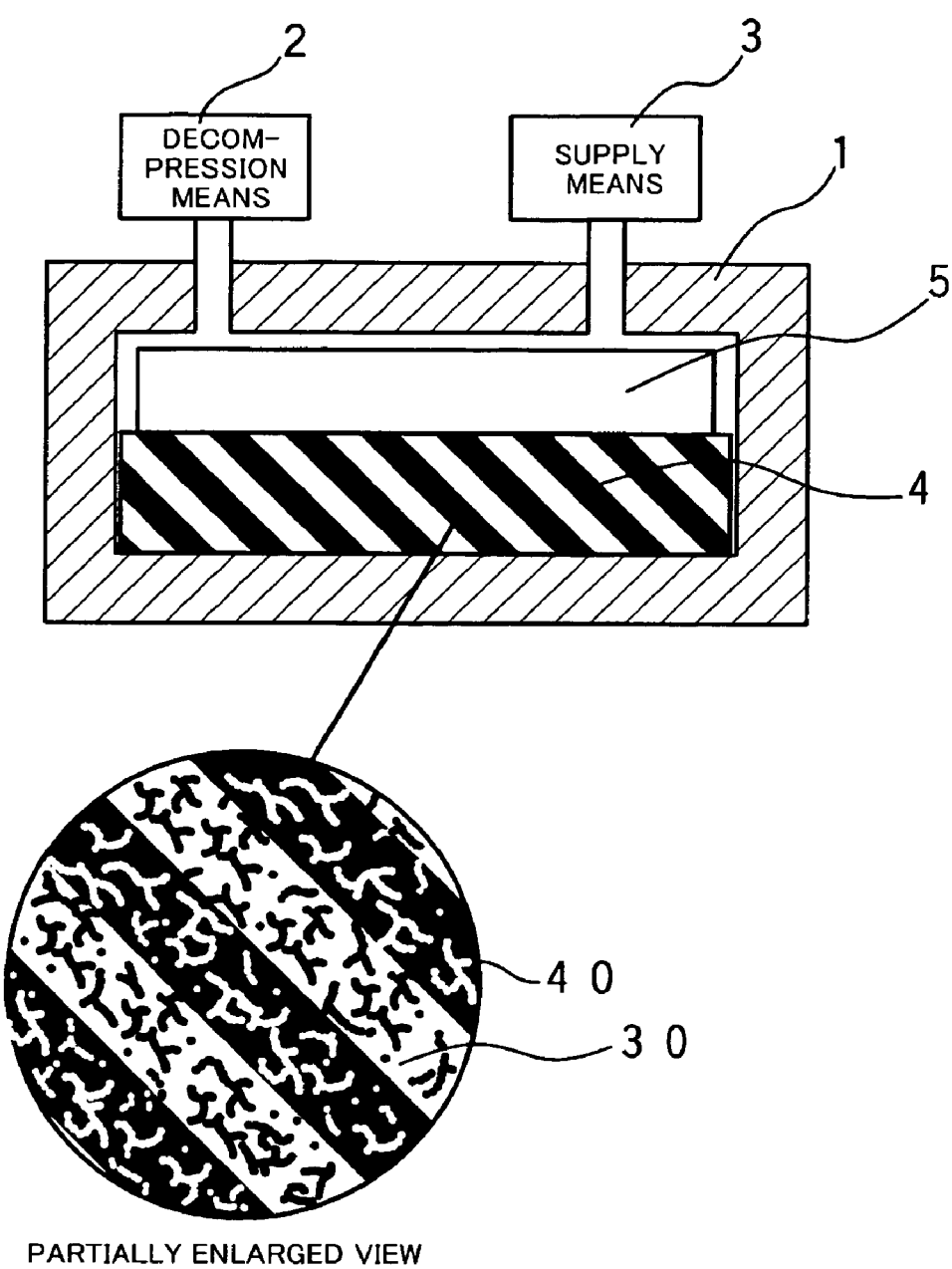
FIG. 2 schematically shows a device for producing a carbon black composite material by using a pressureless permeation method.
Figure 3:
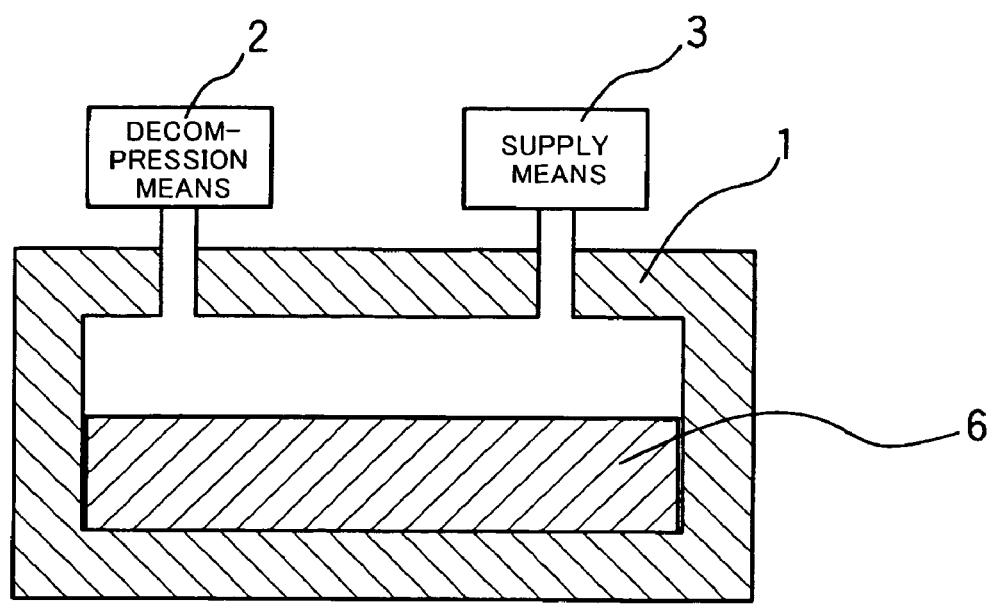
FIG. 3 schematically shows a device for producing a carbon black composite material by using a pressureless permeation method.

FIGS. 2 and 3 are schematic configuration diagrams of a device for producing the carbon black composite material by using the pressureless permeation method. As the composite elastomer obtained in the step (a), a composite elastomer 4 which is compression-formed in a forming die having a shape of the final product may be used, for example. It is preferable that the composite elastomer 4 be noncrosslinked. If the composite elastomer 4 is noncrosslinked, the permeation rate of the melted metal is increased. In FIG. 2, the composite elastomer 4 such as a composite elastomer 4 in which the carbon black 40 is mixed into the noncrosslinked elastomer 30 is placed in a sealed container 1. As shown in the enlarged diagram in FIG. 2, the composite elastomer 4 is formed in a state in which the carbon black 40 is dispersed in the matrix of the elastomer 30. A metal ingot such as an aluminum ingot 5 is placed on the composite elastomer 4. The composite elastomer 4 and the aluminum ingot 5 placed in the container 1 are heated to a temperature equal to or higher than the melting point of aluminum by using a heating means (not shown) provided at the container 1. The heated aluminum ingot 5 melts to become a melted aluminum metal (melted metal). The elastomer 30 in the composite elastomer 4 which is in contact with the melted aluminum metal is decomposed and vaporized, and the melted aluminum metal (melted metal) permeates the space formed by decomposition of the elastomer 30.

In the composite elastomer 4, the space formed by decomposition of the elastomer 30 allows the melted aluminum metal to permeate the entire formed product due to a capillary phenomenon. The melted aluminum metal permeates the elastomer 30 by the capillary phenomenon, whereby the composite elastomer is completely filled with the melted aluminum metal.

The heating by the heating means of the container 1 is then terminated, and the melted metal which has permeated the composite elastomer 4 is allowed to cool and solidify to obtain a carbon black composite material 6 as shown in FIG. 3 in which the carbon black 40 is uniformly dispersed.

In FIG. 2, the atmosphere inside the container 1 may be removed by a decompression means 2 such as a vacuum pump connected with the container 1 before heating the container 1. Nitrogen gas may be introduced into the container 1 from an inert-gas supply means 3 such as a nitrogen gas cylinder connected with the container 1.

In the case of using aluminum as the melted metal, the surface of the aluminum ingot 5 is covered with an oxide. When the melted aluminum metal is caused to permeate, the molecular end of the thermally decomposed elastomer becomes a radical, and the oxide (alumina) on the surface of the melted aluminum metal is reduced by the radical. In this embodiment, since the reducing atmosphere can be generated even inside the composite elastomer by decomposition of the elastomer included in the composite elastomer, the casting process using the pressureless permeation method can be performed without providing a reducing atmosphere processing chamber as in a conventional method. The reducing effect may be promoted by mixing magnesium particles in the composite elastomer in advance as the reducing agent.

The surfaces of the carbon black particles are activated by the radicals of the elastomer molecules decomposed by permeation of the melted aluminum metal, whereby wettability with the melted aluminum metal is improved. The composite material thus obtained includes the carbon black uniformly dispersed in the aluminum matrix. The surface structure of the carbon black composite material obtained according to this embodiment may be analyzed by X-ray photoelectron spectroscopy (XPS) or energy dispersive spectrum (EDS) analysis. The peripheral phase in the composite metal material may be determined by observation using a field emission scanning electron microscope (FE-SEM) and elemental analysis of the vicinity of the irradiation point. In the carbon black composite material in this embodiment, an amorphous peripheral phase including aluminum, nitrogen, and oxygen is formed to cover the carbon black particles. The peripheral phase mainly consists of aluminum, exhibits excellent wettability with the crystalline aluminum as the matrix, and is a homogeneous composite material. The nitrogen and oxygen in the peripheral phase are nitrogen and oxygen present in the container 1 and bonded to the carbon black particles.

The pressureless permeation method is described in the above embodiment. However, a pressure permeation method which pressurizes the material by the pressure of an inert gas atmosphere may also be used, for example.

According to the permeation method in the above embodiment, since the elastomer in the composite elastomer is replaced by the metal material, the dispersion state of the carbon black is uniform in comparison with another casting method. Therefore, the permeation method is relatively advantageous.

The metal used in the casting step (b) may be appropriately selected from metals used in a conventional powder-forming and casting process, such as iron and an iron alloy, aluminum and an aluminum alloy, titanium and a titanium alloy, magnesium and a magnesium alloy, copper and a copper alloy, and zinc and a zinc alloy, either individually or in combination of two or more depending on the application.

The step (b-4) is basically the same as the step (b-1) except for using glass particles instead of the metal particles. For example, a carbon black composite material may be obtained by compressing the composite elastomer including the glass particles obtained in the step (a) or frozen and ground elastomer particles in a die, and sintering the compressed product at a glass sintering temperature such as 750° C. for one hour. It is possible to further mix other glass particles which become the matrix of the composite material in the same manner as in the step (b-1).

The carbon black composite material produced by such powder-forming allows the carbon black to be dispersed in the glass material. It is preferable that the other glass particles used in this step be the same material as the glass particles used to obtain the carbon black composite material. The diameter of the particles may be arbitrarily selected depending on the application of the composite material obtained by powder-forming or the like.

In the step (b-5), a casting method may be used in the same manner as in the step (b-2). As the step (b-5), the composite elastomer obtained in the above embodiment and glass in a fluid state (melted glass) are mixed and caused to solidify to obtain a composite material, for example. In such a glass forming step, the composite elastomer and melted glass are mixed first. Specifically, glass is dissolved in a crucible, and the composite elastomer particles are placed in the crucible while stirring the melted glass to mix the glass and the composite elastomer. The melted glass is caused to solidify in a state in which the composite elastomer is mixed into the melted glass to form a carbon black composite metal material having a desired shape.

In the step (b-6), a permeation method may be used in the same manner as in the step (b-3). In the step (b-6), a glass plate is used instead of the metal ingot (aluminum ingot, for example) 5 in the step (b-3). The glass plate is held at a glass melting temperature such as 600° C. for one hour in a furnace, whereby the melted glass is caused to permeate the composite elastomer 4.

In the step (b), the decomposition gas of the elastomer generated in the production atmosphere is trapped and removed.

The carbon black composite material produced by such a forming step allows the carbon black to be dispersed in the glass.

The glass used in the step (b) may be arbitrarily selected depending on the use.

Examples according to the present invention and Comparative Examples are described below. Note that the present invention is not limited to the following examples.

(1) Noncrosslinked Composite Elastomer

Step 1: An open roll with a roll diameter of six inches (roll temperature: 10 to 20° C.) was provided with a predetermined amount (100 g) (100 parts by weight (phr)) of an elastomer shown in Table 1, and the elastomer was wound around the roll. As the elastomer, natural rubber (NR) with a molecular weight of 3,000,000 was used.

Step 2: Aluminum particles in an amount shown in Table 1 or glass particles in an amount shown in Table 2 were added to the elastomer, and the particles and the elastomer were mixed. Carbon black in an amount shown in Table 1 was further added to the elastomer. The roll distance was set at 1.5 mm. As the carbon black, SAF-HS carbon black having an average particle diameter of about 18 nm and a DBP absorption of 130 $cm^3$/100 g was used in Examples 1 to 6, HAF carbon black having an average particle diameter of about 28 nm and a DBP absorption of 101 $cm^3$/100 g was used in Example 7, SRF-HS carbon black having an average particle diameter of about 72 nm and a DBP absorption of 152 $cm^3$/100 g was used in Example 8, and Ketjenblack having an average particle diameter of about 40 nm and a DBP absorption of 360 $cm^3$/100 g was used in Example 9. As the glass particles, $SiO_2/PbO/B_2O_3$ with an average particle diameter of 30 μm was used. As the aluminum particles, an AC3C aluminum alloy with an average particle diameter of 50 μm was used.

Step 3: After the addition of the carbon black, the mixture of the elastomer and the carbon black was removed from the rolls.

Step 4: The roll distance was reduced from 1.5 mm to 0.3 mm, and the mixture was positioned in the open roll and tight milled. The surface velocity ratio of the two rolls was set at 1.1. The tight milling was repeated ten times.

Step 5: The rolls were set at a predetermined distance (1.1 mm), and the mixture which had been tight milled was positioned and sheeted.

A noncrosslinked composite elastomer was thus obtained.

(2) Carbon Black Composite Material (Aluminum Matrix)

The noncrosslinked composite elastomer including the aluminum particles obtained in (1) was placed in a container (furnace). An aluminum ingot (AC4A aluminum alloy metal) was placed on the noncrosslinked composite elastomer, and the composite elastomer and the aluminum ingot were heated to the melting point of aluminum in an inert gas (nitrogen) atmosphere. The aluminum ingot melted to become a melted aluminum metal. The melted aluminum metal permeated the composite elastomer to replace the elastomer in the composite elastomer. After permeation of the melted aluminum metal was completed, the melted aluminum metal was allowed to cool and solidify to obtain a carbon black composite material (aluminum matrix).

(3) Carbon Black Composite Material (Glass Matrix)

The noncrosslinked composite elastomer including the glass particles obtained in (1) was compression-preformed in a die at 100° C. and 100 MPa, and placed in a container (furnace). A glass plate was placed on the composite elastomer and held in air at the glass melting temperature (600° C.) for one hour. The glass plate melted to become melted glass. The melted glass permeated the composite elastomer to replace the elastomer in the composite elastomer. After permeation of the melted glass was completed, the melted glass was allowed to cool and solidify to obtain a carbon black composite material (glass matrix).

(4) Preparation of Comparative Example Sample 7.5 g (0.75 part by weight) of SAF-HS carbon black used in (1) was mixed with 1000 g (100 parts by weight) of an aluminum alloy melted metal at 750° C., and the mixture was cast to obtain a sample of Comparative Example 1.

As Comparative Example 2, a 100% aluminum alloy ingot was used.

SAF-HS carbon black and glass particles were dry-blended and preformed in a die. A glass plate was placed on the preformed product, and the glass was caused to permeate by holding the preformed product and the glass plate at 600° C. for one hour in air to obtain a sample of Comparative Example 3.

As Comparative Example 4, a glass plate was used.

(5) Measurement of Tensile Strength

The samples of Examples 1 to 9 and Comparative Examples 1 to 4, 10 pieces each, were subjected to a tensile test to determine the maximum value, the minimum value, and the average value of tensile strength. The results are shown in Tables 1 and 2.

TABLE 1

|  |  | Example | | | | | | Comparative Example | |
|---|---|---|---|---|---|---|---|---|---|
|  |  | 1 | 2 | 3 | 7 | 8 | 9 | 1 | 2 |
| Amount of elastomer and fillers (part by weight) | NR elastomer (phr) | 100 | 100 | 100 | 100 | 100 | 100 | — | — |
|  | SAF-HS carbon black (phr) | 1.2 | 6 | 12.1 | 0 | 0 | 0 | 0.75 | 0 |
|  | HAF carbon black (phr) | 0 | 0 | 0 | 6 | 0 | 0 | 0 | 0 |
|  | SRF-HS carbon black (phr) | 0 | 0 | 0 | 0 | 6 | 0 | 0 | 0 |
|  | Ketjenblack (phr) | 0 | 0 | 0 | 0 | 0 | 6 | 0 | 0 |
|  | AC3C aluminum alloy particle (phr) | 500 | 500 | 500 | 500 | 500 | 500 | 100 | 100 |
| Ratio of fillers (vol %) | SAF-HS carbon black (vol %) | 0.2 | 1 | 2 | 1 | 1 | 1 | 1 | — |
|  | AC3C aluminum alloy particle (vol %) | 99.8 | 99 | 98 | 99 | 99 | 99 | 99 | 100 |
| Tensile strength | Maximum value (MPa) | 450 | 850 | 1340 | 780 | 800 | 900 | 670 | 305 |
|  | Minimum value (MPa) | 360 | 680 | 950 | 620 | 640 | 710 | 360 | 210 |
|  | Average value (MPa) | 400 | 760 | 1130 | 690 | 710 | 800 | 520 | 255 |

TABLE 2

|  |  | Example | | | Comparative Example | |
|---|---|---|---|---|---|---|
|  |  | 4 | 5 | 6 | 3 | 4 |
| Amount of elastomer and fillers (part by weight) | NR elastomer (phr) | 100 | 100 | 100 | — | — |
|  | SAF-HS carbon black (phr) | 1.4 | 6.9 | 14.3 | 0.48 | 0 |
|  | $SiO_2/PbO/B_2O_3$ glass particle (phr) | 500 | 500 | 500 | 100 | 100 |
| Ratio of fillers (vol %) | SAF-HS carbon black (vol %) | 0.2 | 1 | 2 | 1 | — |
|  | $SiO_2/PbO/B_2O_3$ glass particle (vol %) | 99.8 | 99 | 98 | 99 | 100 |
| Tensile strength | Maximum value (MPa) | 78 | 125 | 185 | 78 | 62 |
|  | Minimum value (MPa) | 63 | 101 | 164 | 36 | 48 |
|  | Average value (MPa) | 70 | 113 | 172 | 60 | 55 |

From the results shown in Tables 1 and 2, it was found that the tensile strength was nonuniform depending on the sample in Comparative Examples 1 and 3, and that the tensile strength was almost uniform in Examples 1 to 9. It was found from Examples 2 and 7 to 9 that the tensile strength is improved by using carbon black having a higher DBP absorption (grown aggregate).

Therefore, it was found that the carbon black is uniformly dispersed in the metal or glass matrix according to the present invention.

From the results shown in Tables 1 and 2, it was also found that the tensile strength of Examples 1 to 3 and 7 to 9 was higher than the tensile strength of Comparative Example 2, and that the tensile strength of Examples 4 to 6 was higher than the tensile strength of Comparative Example 4.

Therefore, it was found that the strength of the carbon black composite material was improved according to the present invention in comparison with the metal or glass material.

Figure 5:
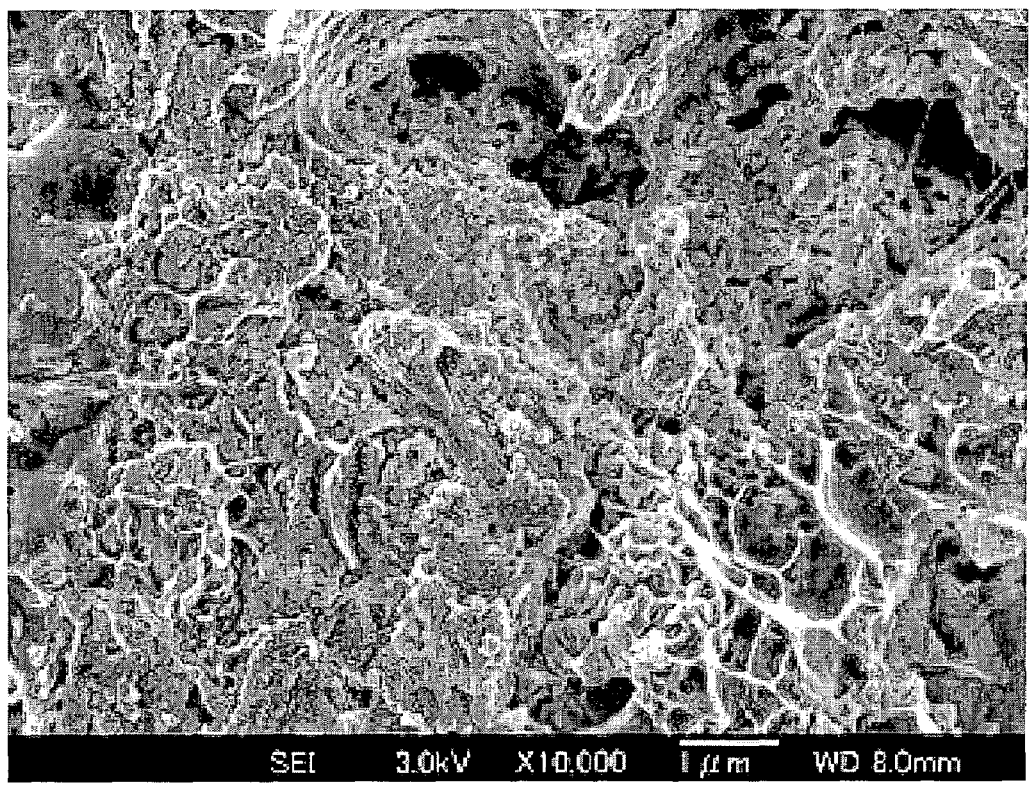
FIG. 5 is an electron micrograph of the fracture plane of a carbon black composite material taken by using a scanning electron microscope.
Figure 6:
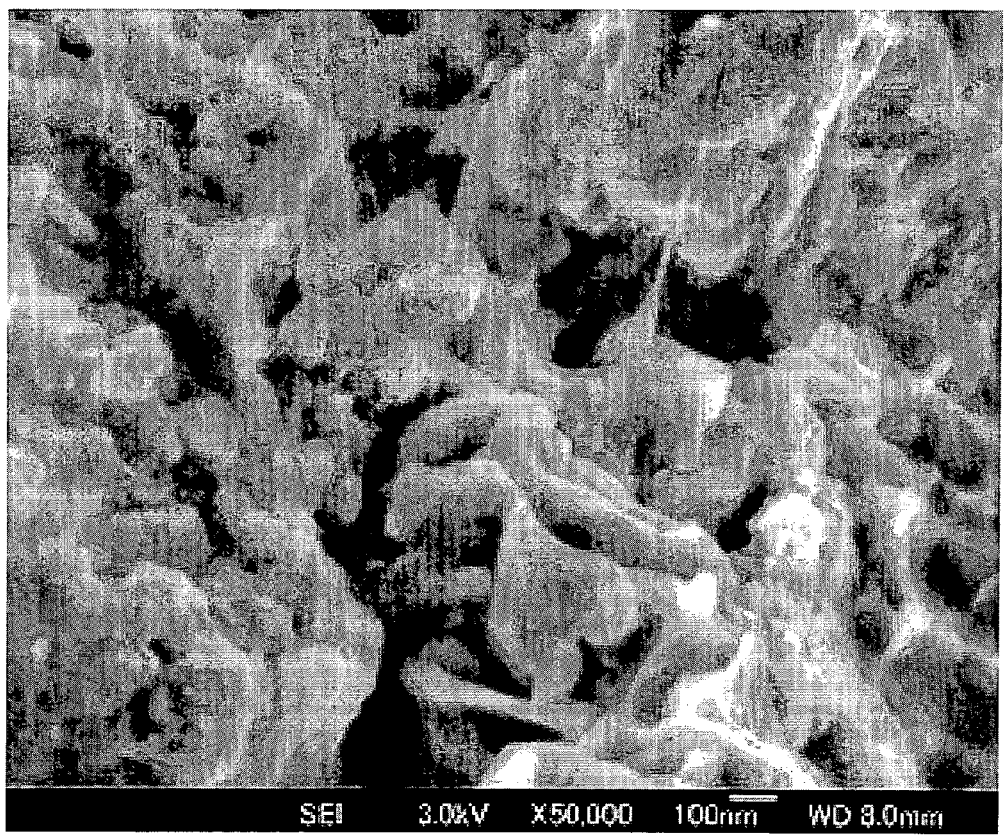
FIG. 6 is a partially enlarged electron micrograph of the fracture plane of a carbon black composite material taken by using a scanning electron microscope.

As Example 10, 20 g of SAF-HS carbon black used in Examples 1 to 3, 500 g of aluminum particles (purity: 99.85%, average particle diameter 28 μm), and 10 g of magnesium particles (purity: 99.8%, average particle diameter 45 μm) were added to 100 g of natural rubber (NR) to obtain a composite elastomer in the same manner as in (1), and a carbon black composite material (aluminum matrix) was prepared in the same manner as in (2). The carbon black content in the carbon black composite material was 1.6 vol %. A cube with dimensions of 10×10×5 mm made of the carbon black composite material of Example 10 was compressed at 0.05 mm/min using a compression tester ("Autograph AG-1" manufactured by Shimadzu Corporation) to obtain a stress-strain curve 100 shown in FIG. 7. For comparison, a stress-strain curve 200 of the pure aluminum sample of Comparative Example 2 was obtained in the same manner as described above. FIG. 5 shows a micrograph (acceleration voltage: 3 kV, magnification: 10.0 k) of the fracture plane of the carbon black composite material of Example 10 taken using a scanning electron microscope ("FE-SEM JMS-7400" manufactured by JEOL Ltd.), and FIG. 6 shows a partially enlarged photograph (acceleration voltage: 3 kV, magnification: 50.0 k).

Figure 4:
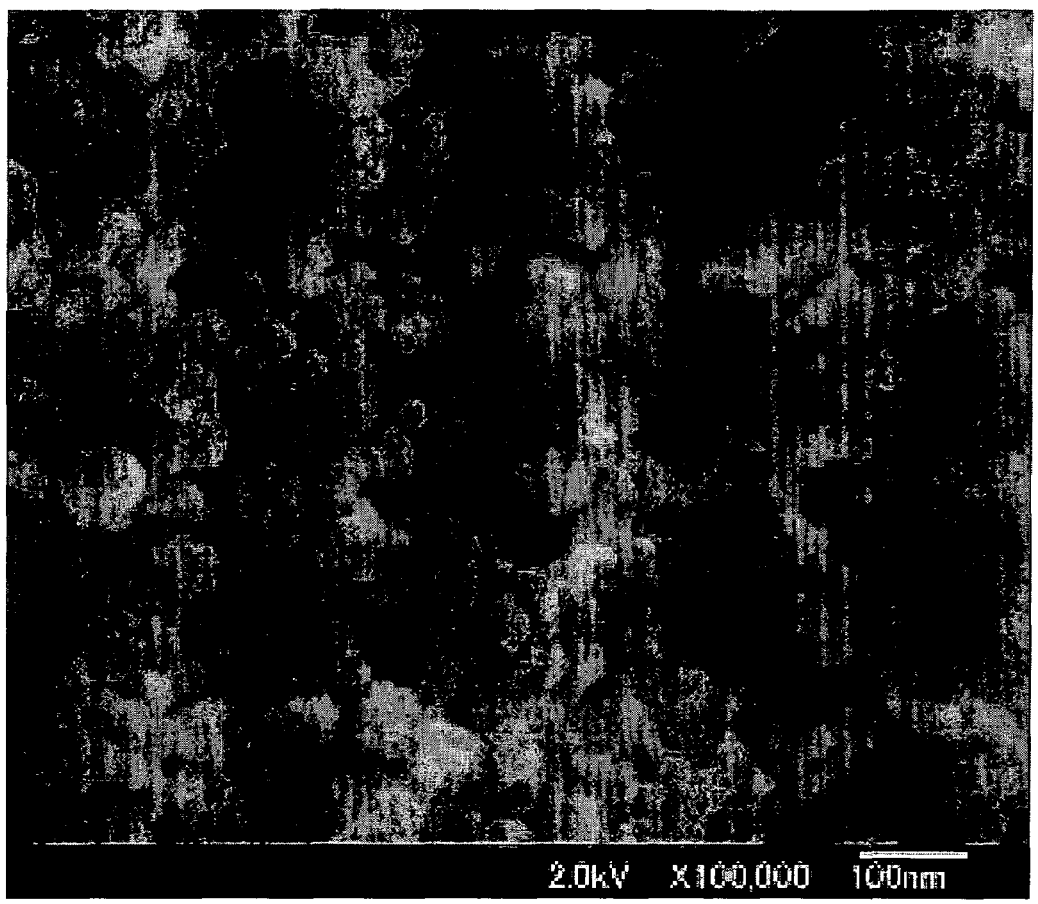
FIG. 4 is an electron micrograph of SAF-HS carbon black taken by using a scanning electron microscope.
Figure 7:
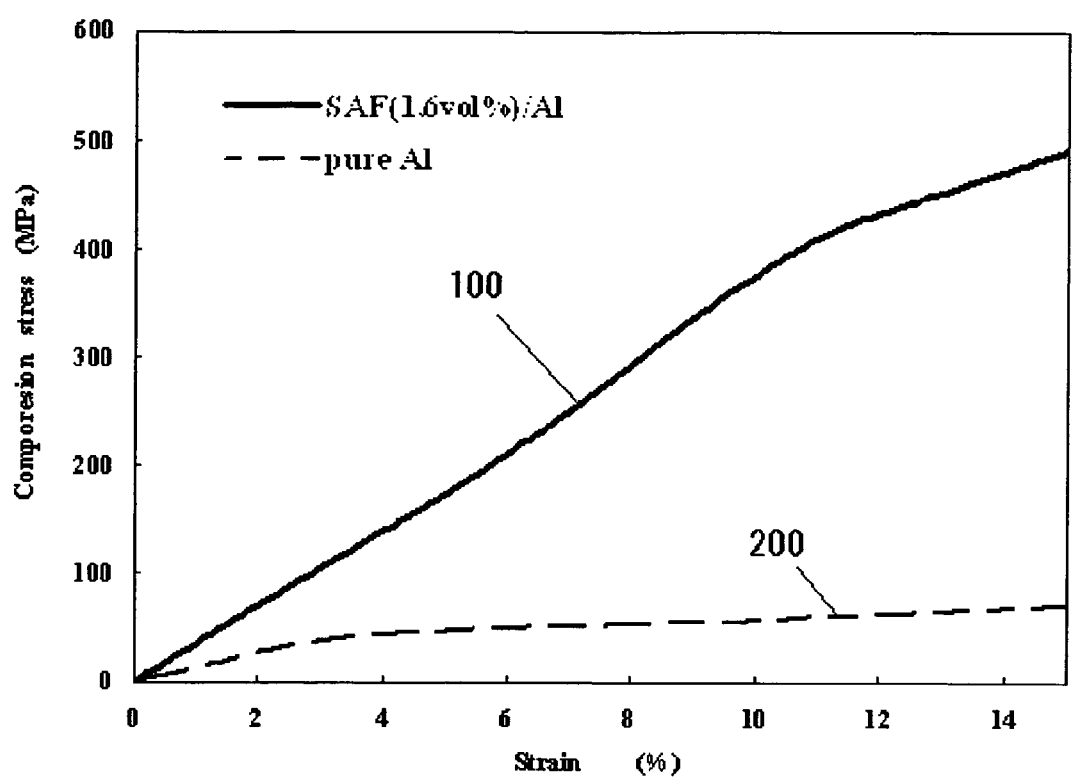
FIG. 7 is a stress-strain curve of a carbon black composite material.

FIG. 4 is an electron micrograph (acceleration voltage: 2 kV, magnification: 100.0 k) of the SAF-HS carbon black used in Example 10 taken using a scanning electron microscope. As is clear from the comparing between FIG. 4 and FIG. 6, the carbon black particles were not observed on the fracture plane of the carbon black composite material. In FIG. 6, a block-shaped peripheral phase having a size of several tens to 100 nm and a rod-shaped peripheral phase having a size of 30 to 100 mm which covered the carbon black were observed. Therefore, according to the carbon black composite material of the present invention, it was found that the carbon black exhibited improved wettability to such an extent that the carbon black was not separated from the aluminum matrix, and the carbon black was covered with the peripheral phase. FIG. 7 indicates that the carbon black composite material exhibited stress higher than aluminum.

Although only some examples of the present invention have been described in detail above, those skilled in the art will readily appreciate that many modifications are possible without materially departing from the novel teachings and advantages of this invention. Accordingly, all such modifications are intended to be included within scope of this invention.

What is claimed is:

1. A method of producing a carbon black composite material, the method comprising:
   (a) mixing an elastomer and carbon black to obtain a composite elastomer; and
   (b) mixing the composite elastomer and a matrix material to obtain a carbon black composite material in which the carbon black is uniformly dispersed in the matrix material, and decomposing and removing the elastomer in the composite elastomer.

2. The method of producing a carbon black composite material as defined in claim 1,
   wherein the step (a) includes mixing and dispersing the carbon black in the elastomer by a shear force.

3. The method of producing a carbon black composite material as defined in claim 1,
   wherein the carbon black has an average constituent particle diameter of 100 nm or less.

4. The method of producing a carbon black composite material as defined in claim 1, wherein the carbon black has a DBP absorption of 50 $cm^3/100$ g or more.

5. The method of producing a carbon black composite material as defined in claim 1, wherein the elastomer has a molecular weight of 5,000 to 5,000,000.

6. The method of producing a carbon black composite material as defined in claim 1,
   wherein at least one of a main chain, a side chain, and a terminal chain of the elastomer includes at least one of a double bond, a triple bond, α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

7. The method of producing a carbon black composite material as defined in claim 1,
   wherein a network component of the elastomer in a non-crosslinked form has a spin-spin relaxation time ($T2n$) measured at 30° C. by a Hahn-echo method using a pulsed nuclear magnetic resonance (NMR) technique of 100 to 3,000 μsec.

8. The method of producing a carbon black composite material as defined in claim 1,
   wherein a network component of the elastomer in a crosslinked form has a spin-spin relaxation time ($T2n$) measured at 30° C. by a Hahn-echo method using a pulsed nuclear magnetic resonance (NMR) technique of 100 to 2,000 μsec.

9. The method of producing a carbon black composite material as defined in claim 1, wherein the matrix material is a metal.

10. The method of producing a carbon black composite material as defined in claim 9, wherein the metal is aluminum or an aluminum alloy.

11. The method of producing a carbon black composite material as defined in claim 9, wherein the step (b) includes powder-forming the composite elastomer.

12. The method of producing a carbon black composite material as defined in claim 9,
    wherein the step (b) includes mixing the composite elastomer and the metal in a fluid state, and causing the mixture to solidify.

13. The method of producing a carbon black composite material as defined in claim 9,
    wherein the step (b) includes causing the metal that has been melted to permeate the composite elastomer to replace the elastomer with the melted metal.

14. The method of producing a carbon black composite material as defined in claim 1, wherein the matrix material is glass.

15. The method of producing a carbon black composite material as defined in claim 14, wherein the step (b) includes powder-forming the composite elastomer.

16. The method of producing a carbon black composite material as defined in claim 14,
    wherein the step (b) includes mixing the composite elastomer and the glass in a fluid state, and then causing a mixture of the composite elastomer and the glass to solidify.

17. The method of producing a carbon black composite material as defined in claim 14,
    wherein the step (b) includes causing the glass that has been melted to permeate the composite elastomer to replace the elastomer with the melted glass.

* * * * *

UNITED STATES PATENT AND TRADEMARK OFFICE
CERTIFICATE OF CORRECTION

PATENT NO.        : 7,423,085 B2                                     Page 1 of 1
APPLICATION NO.   : 11/046249
DATED             : September 9, 2008
INVENTOR(S)       : Toru Noguchi and Akira Magario It is certified that error appears in the above-identified patent and that said Letters Patent is hereby corrected as shown below:

Title page,
Replace Item [75], to read as follows:
--[75] Inventors: Toru Noguchi, Ueda (JP); Akira Magario Chiisagata (JP)--

Signed and Sealed this

Twenty-fourth Day of March, 2009

JOHN DOLL
*Acting Director of the United States Patent and Trademark Office*